T6544

358-74 OR 3,621,123 SR

[11] 3,621,123

[72] Inventors Ryoichi Hirota Yokohama; Tohru Fujishima, Yokohama; Gentaro Miyazaki, Fujisawa; Tadahiko Iwasaki, Kamakura; Mitsuharu Akatsu, Yokohama; Tomoo Kinoshita, Yokohama, all of Japan

[21] Appl. No. 38,690
[22] Filed May 19, 1970
[45] Patented Nov. 16, 1971
[73] Assignee Hitachi, Ltd. Tokyo, Japan
[32] Priority May 20, 1969
[33] Japan
[31] 44/39094

[54] HIGH-VOLTAGE REGULATION CIRCUIT FOR A COLOR TELEVISION RECEIVER
21 Claims, 13 Drawing Figs.

[52] U.S. Cl. .......... 178/5.4 R, 178/7.5 R, 178/DIG. 11
[51] Int. Cl. .......... H04n 9/12, H04n 3/18
[50] Field of Search .......... 178/5.4, 6 PS, 7.5

[56] References Cited
UNITED STATES PATENTS
3,519,741 7/1970 Knight .......... 178/7.5
FOREIGN PATENTS
1,128,957 10/1968 Great Britain .......... 178/6 PS

*Primary Examiner*—Richard Murray
*Attorney*—Craig, Antonelli, Stewart & Hill

ABSTRACT: A high-voltage regulation circuit for a color television receiver comprising a dummy coil which is equivalent to a horizontal deflection coil a high-voltage circuit and a variable inductance element connected in parallel with said dummy coil, thereby controlling the inductance of said variable inductance element in response to the variation of a high voltage of the high-voltage circuit.

INVENTORS

Ryoichi Hirota, Tohru Fujishima, Gentaro Miyazaki, Tadahiko Iwasaki, Mitsuharu Akatsu AND Tomeo Kinoshita BY Craig, Antonelli, Stewart & Hill

ATTORNEYS

INVENTORS
RYOICHI HIROTA, TOHRU FUJISHIMA,
GENTARO MIYAZAKI, TADAHIKO IWASAKI,
MITSUHARU AKATSU AND TOMOO KINOSHITA

BY Craig, Antonelli, Stewart & Hill
ATTORNEYS

INVENTORS
RYOICHI HIROTA, TOHRU FUJISHIMA
GENTARO MIYAZAKI, TADAHIKO IWASAKI,
MITSUHARU AKATSU AND TOMOO KINOSHITA

BY Craig, Antonelli, Stewart & Hill
ATTORNEYS

INVENTORS
RYOICHI HIROTA, TOHRU FUJISHIMA,
GENTARO MIYAZAKI, TADAHIKO IWASAKI,
MITSUHARU AKATSU AND TOMOO KINOSHITA

BY Craig, Antonelli, Stewart & Hill
ATTORNEYS

INVENTORS

RYOICHI HIROTA, TOHRU FUJISHIMA,
GENTARO MIYAZAKI, TADAHIKO IWASAKI,
MITSUHARU AKATSU AND TOMOO KINOSHITA

BY Craig, Antonelli, Stewart & Hill

ATTORNEYS

INVENTORS
RYOICHI HIROTA, TOHRU FUJISHIMA,
GENTARO MIYAZAKI, TADAHIKO IWASAKI,
MITSUHARU AKATSU AND TOMOO KINOSHITA

BY Craig, Antonelli, Stewart & Hill
ATTORNEYS

HIGH-VOLTAGE REGULATION CIRCUIT FOR A COLOR TELEVISION RECEIVER

BACKGROUND OF THE INVENTION

1. Field of the Invention

The present invention relates to a high-voltage regulation circuit, and more particularly to a circuit for regulating an anode voltage of a cathode-ray tube in a color television receiver.

2. Description of the Prior Art

In a black-and-white television receiver, since the variation of a beam current of a cathode-ray tube (CRT) due to change in the brightness of a picture is small, the variation of a high voltage due to the variation of the beam current does not cause many problems. Therefore, no high-voltage regulation circuit is usually used in such type. In a color television receiver, however, the variation of a beam current is about five times as large as that of the black-and-white television receiver, so that the variation of the high voltage is remarkably large. As a result, various problems occur as follows:

1. When a beam current is decreased, a high voltage is increased, so that trouble due to a spark is apt to occur;
2. When the beam current is increased, the high voltage is decreased, so that the brightness of a picture is reduced;
3. The variation in the beam current causes the horizontal and vertical raster sizes unstable;
4. The deviation of convergence varies remarkably; and
5. The deviation of focusing is large.

Therefore, in order to prevent the occurrence of such the problems it is required to regulate the high voltage.

One of conventionally known high-voltage regulation circuits is such that a shunt regulator tube is connected in parallel with a high-voltage output, whereby the high voltage is regulated to maintain substantially a predetermined value in response to the variation in a beam current of a color CRT. However, the shunt regulator tube must be a triode of a special type which can wear well with a high anode voltage but it has a large anode loss, and therefore, it is very expensive because of short life, and is not economical. Further, in a large scale color television receiver in which a high voltage exceeding 20 kilovolts is used, a shunt regulator tube provided therewith may radiate a harmful X-ray, so that it injuriously affects the human body. Furthermore, it is hardly attained to transistorize such known high-voltage regulation circuit, so that realization of any all-transistorized color television receiver is impossible.

It is therefore desired to develop an easily transistorizable high-voltage regulation circuit. Moreover, it is desired to realize an all-transistorized color television receiver which has a relatively high high voltage and a large deflection power requisite for operating a relatively large color cathode-ray tube at a relatively large deflection angle.

The high voltage of most television receivers is produced from a flyback transformer during a period of the flyback terms in a horizontal scanning circuit, and, unfortunately, the horizontal output power transistors, now available, have their maximum power unsatisfactory for a use in an all-transistorized color television of a large scale. In other words, once a high-voltage output power is consumed too much, a horizontal deflection power is undesirably decreased, which is a great drawback existing at present in the field of manufacture of all-transistorized television receivers.

SUMMARY OF THE INVENTION

An object of the present invention is to provide a new and improved high-voltage regulation circuit applicable to a color cathode-ray tube of a large size operable at a large deflection angle without using any shunt regulator tube.

Another object of the present invention is to provide a high-voltage regulation circuit which makes it possible to realize an all-transistorized color television receiver.

In order to achieve the above-mentioned objects and overcome the drawbacks existing in the conventional circuits, the present invention is characterized in providing a horizontal deflection equivalent circuit in combination with a high-voltage developing circuit which is known per se.

The horizontal deflection equivalent circuit has substantially as same a function and a construction as those of a horizontal deflection circuit conventionally known per se in synchronized relation there between, and it employs a dummy coil as a comparative substitution for the horizontal deflection coil in the horizontal deflection circuit since the inductance of the dummy coil is determined to be substantially as same as that of the horizontal deflection coil.

A primary winding of a flyback transformer in the high-voltage developing circuit is coupled to the horizontal deflection equivalent circuit so as to be energized and to develop a high voltage across a secondary winding of the flyback transformer.

A high-voltage regulation coil or generally referred to hereinafter as a variable inductance element having a variable inductance is connected in parallel to the dummy coil and the variable inductance of the variable inductance element is changed in response to the variation in the high voltage developed by the high-voltage developing circuit.

Other objects, features and advantages of the present invention will be apparent from the following detailed description taken in conjunction with the accompanying drawings.

DESCRIPTION OF THE PREFERRED EMBODIMENTS

Figure 1:
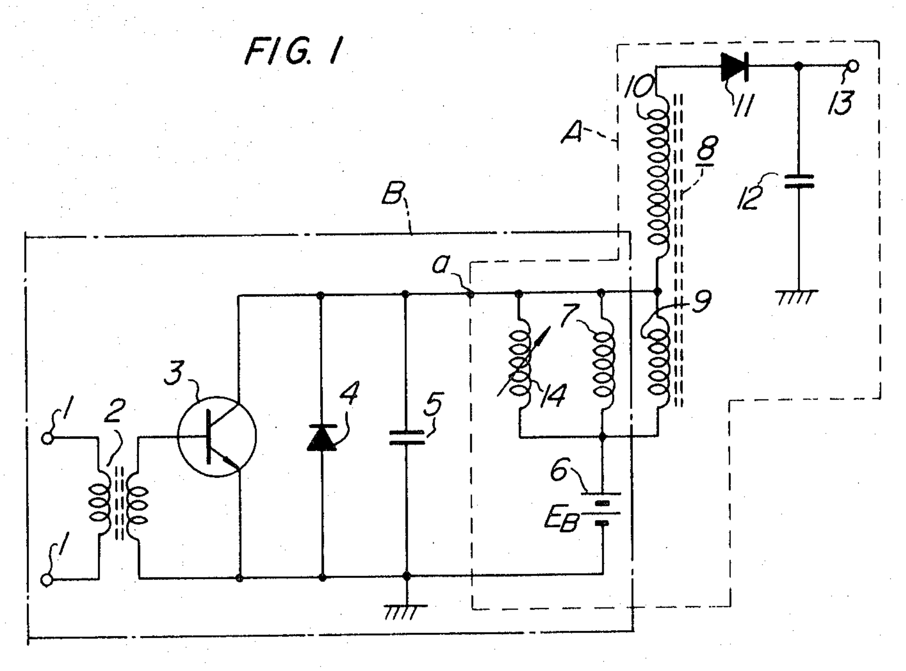
FIG. 1 is a circuit diagram explaining the basic principle of the present invention.

Referring to FIG. 1 there is provided a basic circuit of the present invention, which includes a horizontal deflection equivalent circuit B and a high-voltage developing circuit A.

The horizontal deflection equivalent circuit B includes an output power transistor 3 which is supplied to its base with an input signal applied to the input terminal 1 through an input transformer 2 and which operates substantially equivalent to a horizontal deflection power transistor in a horizontal deflection circuit employed in a color television receiver to which the present embodiment circuit is applied.

The horizontal deflection equivalent circuit further includes a damper diode 4 connected between the collector and the emitter of the transistor 3, a resonance capacitor 5 coupled in parallel with the damper diode, and a dummy coil 7 having an inductance substantially equal to that of a conventional horizontal deflection circuit as above mentioned. This dummy coil is connected in parallel with the damper diode and the capacitor via a voltage source 6.

Whereas the high-voltage circuit A comprises a flyback transformer (FBT) 8 whose primary winding is connected in parallel with the dummy coil 7, a high-voltage rectifying diode 11 connected with a secondary winding 10 of the flyback transformer 8, a smoothing capacitor 12 connected to the diode 11 and a high voltage output terminal 13 as shown by a dotted line in FIG. 1.

Numeral 14 designates a high-voltage regulation coil which is connected in parallel with the dummy coil 7 as well as the primary winding 9 of the flyback transformer 8. The present invention is also characterized by the provision of this regulation coil 14.

A color television receiver to which the present invention is applied has, as mentioned before, an independent horizontal deflection circuit which is substantially same in the structure and function as those of the horizontal deflection equivalent circuit B of FIG. 1 without the regulation coil 14 and wherein an actual horizontal deflection coil for performing horizontal deflection of a color cathode-ray tube in the receiver is employed at a position corresponding to that of the dummy coil 7 of the circuit B. This independent horizontal deflection circuit is separated from the high-voltage circuit A, and thus omitted from the showing.

Figure 2:
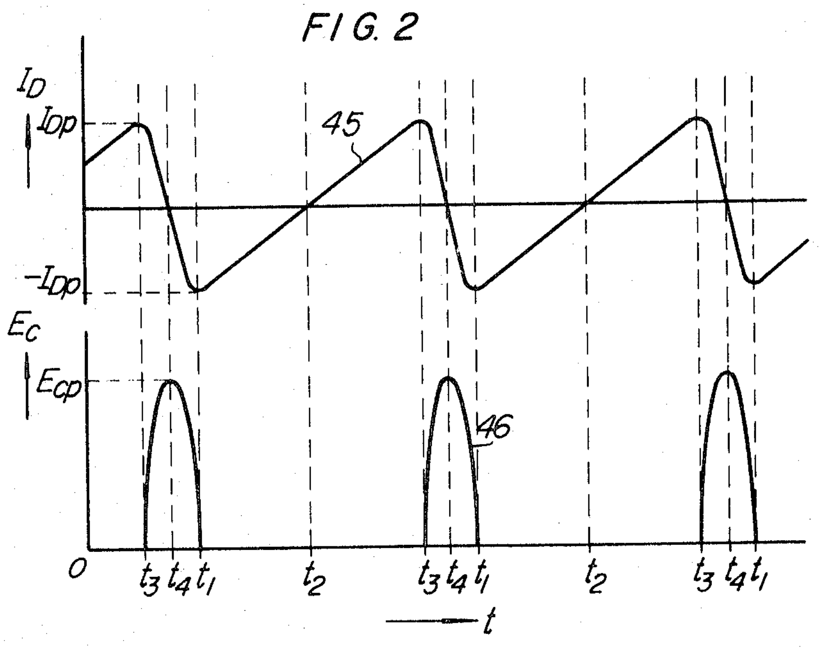
FIG. 2 is a diagram showing waveforms of voltage and current for explaining the operation of the horizontal deflection circuit and the high-voltage circuit in a color television receiver.

FIG. 2 shows functional waveforms of the above circuit, in which numeral 45 is a waveform of a current flowing through the dummy coil 7, 46 is a waveform of a collector voltage of the output transistor 3, $t_1 \rightarrow t_2 \rightarrow t_3$ is a term which is equivalent to a scanning term and $t_3 \rightarrow t_4 \rightarrow t_1$ is a term which is equivalent to a flyback term. The operation of the present invention will be described hereinafter.

Though the following description of the operation is made in regard to a transistorized television receiver, it is needless to say that the description can be employed also in a vacuum-tube-type television receiver. It is now assumed that since the inductance $L_p$ of the primary winding 9 of the flyback transformer 8 is generally sufficiently large as compared with the inductance $L_D$ of the dummy coil 7, the inductance $L_p$ is negligible.

Now, the parallel inductance L of the dummy coil 7 and the high-voltage regulation coil 14 is expressed as:

$$L=\frac{L_X \cdot L_D}{L_X+L_D} \qquad (1)$$

where $L_X$ represents the inductance of the high-voltage regulation coil. Assuming that $I_D$ represents a current flowing through the dummy coil 7 and $I_x$ represents a current flowing through the high-voltage regulation coil 14, the sum of the currents $I_{XD}$ is expressed as:

$$I_{XD}=I_X+I_D \qquad (2)$$

Now, if when $t=t_2$ an input pulse is applied to the input terminal 1, the output transistor 3 is made conductive, the voltage $E_B$ of the power source 6 is applied across the dummy coil 7, so that the dummy coil current $I_D$ is linearly increased at the constant rate of $E_B/L_D$ as time $t$ is $t_2 \leqq t \leqq t_3$ and $I_D$ and $I_{XD}$ are expressed as:

$$I_D=E_B/L_D(t-t_2) \qquad (3)$$

$$I_{XD}=E_B/L(t-t_2) \qquad (4)$$

Next, when $t=t_3$, $I_D$ becomes the maximum value $I_{DP}$ and $I_{XD}$ becomes the sum $I_{XDP}$ of the maximum current flowing through the dummy coil 7 and the current flowing through the high-voltage regulation coil 14, so that the output transistor 3 is turned in its cutoff state and the flyback term starts. Now, consider the case without the high-voltage regulation coil 14, the dummy coil current $I_D$ flows into the resonance capacitor 5, so that parallel resonance is caused by the inductance $L_D$ of the dummy coil 7 and the capacitance C of the resonance capacitor 5 and thus, a high pulse voltage as shown by a waveform 46 in FIG. 2 is developed at the collector or the output transistor 3. That is, when time $t$ is $t_3 \leqq t \quad t_1$, $I_D$ is expressed approximately as:

$$I_D \doteqdot I_{DF} \cdot \cos\frac{t-t_3}{\sqrt{L_D C}} \qquad (5)$$

the collector voltage $E_C$ is given as:

$$E_C \doteqdot -L_D\frac{dI_D}{dt} \doteqdot I_{DP}\sqrt{\frac{L_D}{C}}\sin\frac{t-t_3}{\sqrt{L_L CC}} \qquad (6)$$

and therefore, at approximately a quarter of the resonance period, namely, when $t=t_4$, $E_C$ takes its maximum voltages $E_{cp}$.

$$E_{CP}=I_{DP}\sqrt{L_D/C} \qquad (7)$$

On the other hand, the dummy coil current $I_D$ which has obtained the positive maximum value at $t=t_3$ becomes zero at $=t_4$ and thereafter the direction of $I_D$ is reversed. At $t=t_1$ the current $I_D$ takes the negative maximum value $-I_{DP}$ and simultaneously the collector voltage $E_C$ becomes zero. Thereafter, $E_C$ develops a negative voltage and then the damper diode 4 conducts so that the equivalent scanning term starts. At this time, the source voltage $E_B$ is again applied across the dummy coil 7, the current $I_D$ is linearly increased from $-I_{DP}$ at the constant rate of $E_B/L_D$, and thus, it becomes zero at $t=t_2$. Then, if an input pulse is again applied to the input terminal 1, the transistor 3 is rendered conductive to return to its initial state. Thus, repetition of such a cycle is carried out.

Further, an anode voltage of a cathode-ray tube is provided at the output terminal 13 in such a manner that a high pulse voltage $E_C$ developed at the collector of the output transistor 3 during the aforementioned equivalent flyback term is boosted by the flyback transformer 8 and a voltage appearing across a secondary winding 10 of the transformer 8 is rectified by the high-voltage rectifier diode 11 and the capacitor 12. Therefore, the basic principles of the present invention for regulating the variation of the above-mentioned anode voltage are to control a voltage developed across the primary winding 9 of the flyback transformer 8, i.e., the collector voltage $E_C$ of the output transistor 3 in response to the amount of variation in the anode voltage so as to reduce the variation thereof.

Now, consider the case where the high-voltage regulation circuit 14 is added to the horizontal deflection equivalent circuit B. During the term $t_2 \leqq t \leqq t_3$, no variation in dummy coil current $I_D$ occurs even upon the addition of the coil 14, as indicated by the formula (3), since the coil 14 and the coil 7 are connected in parallel to each other with respect to the power source 6.

On the other hand, when $t_3 \leqq t \leqq t_1$, namely, during the equivalent flyback term, a resonance circuit is constituted by the coil 7, the coil 14 and the capacitor 5, whose resonance current $I_{XD}$ (i.e. the sum of current flowing in the coil 7 and the coil 14) is given approximately by:

$$I_{XD} \doteqdot I_{XDP}\cos\frac{t-t_3}{\sqrt{LC}} \qquad (8)$$

Also, the collector voltage $E_C$ of the transistor 3 is given approximately as:

$$E_C \doteqdot -L\frac{dIXD}{dt} \doteqdot I_{XDP}\sqrt{\frac{L}{C}}\sin\frac{t-t_3}{\sqrt{LC}} \qquad (9)$$

Therefore, $E_C$ takes the maximum voltage $E_{cp}$ at $t=t_4$.

$$E_{cp}=I_{XDP}\sqrt{L/C} \qquad (10)$$

Further, the maximum current $I_{XDP}$ of $I_{XD}$ is obtained from the formula (4) as:

$$I_{XDP}=E_B/L(t_3-t_2) \qquad (11)$$

From the formulas (10) and (11) the aforementioned maximum voltage $E_{cp}$ can also be given as:

$$E_{cp}=E_B\sqrt{LC}(t_3-t_2) \qquad (12)$$

From the formula (12), it will be understood that the peak value $E_{cp}$ of a pulse appearing at the collector of the transistor 3 varies inversely with the root of the parallel inductance L. If in case of occurrence of variations in the anode voltage, for example, the anode voltage is lowered by increase in the current of a CRT the drop component thereof must be compensated in order to regulate the lowered anode voltage. For this purpose the voltage $E_{cp}$ can be made to rise. In other words, the parallel inductance L should be reduced. From the formula (1) it is seen that the inductance $L_x$ of the high-voltage regulation coil should be reduced. In order to vary the inductance $L_x$ the number of turns of the coil 14 is varied or alternatively magnetic saturation in a core which is inserted into the coil 14 is varied.

The method for varying the number of turns of the coil 14 is such that a plurality of taps are provided on the coil 14 and these are suitably changed over depending upon the variation of a beam current of the CRT. However, the utilization of magnetic saturation of the core is the simplest and most effective method.

Description will be made of some embodiments according to the present invention in detail hereunder. The following embodiments are shown merely by an essential circuit portion A taken by separating the associated circuit at a point *a* in FIG. 1.

Figures 3, 4A:
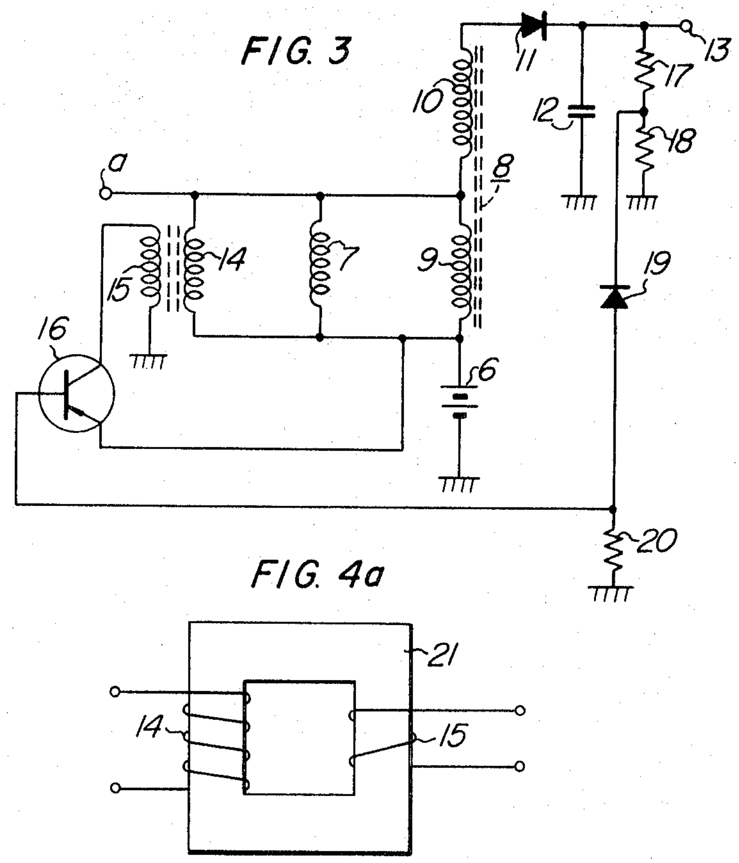
FIG. 3 is a diagram showing an essential portion of the circuit according to an embodiment of the present invention.
FIGS. 4*a* and 4*b* are diagrams showing embodiments of a high-voltage regulation coil.

Referring to FIG. 3, there is shown one embodiment of the present invention, in which reference numerals of parts correspond to those in FIG. 1, and further a numeral 15 designates a control winding for controlling the inductance $L_r$ of the high-voltage regulation coil 14, 16 a high-voltage regulation transistor, 17 and 18 high-voltage dividing resistors, 19 a zener diode and 20 a resistor.

Operation of the aforementioned constitution will be described. A variation of the anode voltage is detected across the high-voltage dividing resistor 18, and the thus detected signal corresponding to the variation in the anode voltage is applied through the zener diode 19 to the base electrode of the high-voltage regulation transistor 16. The emitter of the transistor 16 is connected to the power source 6 and the control winding 15 is connected at one end thereof to the collector of the transistor 16 and at the other end thereof to ground. One embodiment of a high-voltage regulation variable reactance $L_r$ is shown in FIG. 4*a*, in which numeral 21 represents a saturable core, 14 and 15 the high-voltage regulation coil and the control winding, respectively. The magnetic flux density of the saturable core 21 is controlled by the magnitude of a current flowing in the control winding 15. That is, when the current flowing in the winding 15 increases so that the magnetic flux density of the saturable core 21 approaches the saturation magnetic flux density thereof the magnetic permeability $\mu$ is decreased, so that the inductance $L_r$ of the winding 14 is also reduced. Further, if the current is decreased the reverse phenomenon takes place, namely, the magnetic permeability $\mu$ is increased and the reactance $L_r$ is also increased.

The high-voltage regulation variable inductance $L_r$ which is constituted as described above operates in such a manner that if the anode voltage is decreased the base voltage of the transistor 16 is lowered and the collector current passing through the control winding 15 is increased whereby the magnetic flux density of the saturable core 21 approaches the saturation magnetic flux density thereof, so that the inductance $L_r$ is decreased and the collector voltage of the output transistor 3 is increased. Thus, high-voltage regulation can be achieved.

Figure 4B:
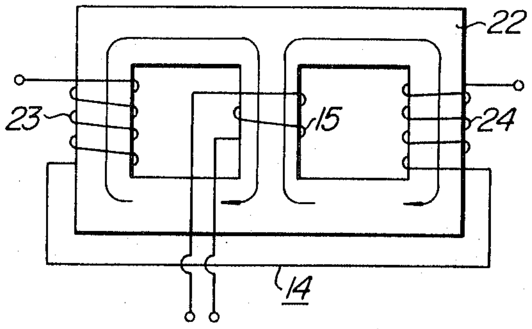

FIG. 4*b* shows another embodiment of the high-voltage regulation variable inductance $L_r$ whose operation is the same as that in FIG. 4*a*, the description thereof being omitted accordingly. The construction is such that windings 23 and 24 which constitute the high-voltage regulation coil 14 are wound around a triped type saturable core 22 and the control winding 15 is also wound therearound.

The thus constructed inductance is advantageous in that since no voltage is induced in the control winding 15 by the voltage appearing across the high-voltage regulation coil 14 depending upon the variation of the beam current of the CRT, the protection of the high-voltage regulation transistor 16 can be provided. On the contrary, the same effect is obtained also in such construction of the variable inductance that the windings 23 and 24 are used as control windings and the winding 15 is used as a high-voltage regulation coil. In FIG. 3, a signal detected across the dividing resistor 18 may be applied directly to the base of the transistor 16. However, if the zener diode 19 is inserted between the resistor 18 and the base of the transistor 16, the base DC potential can advantageously be selected arbitrarily.

Figure 5:
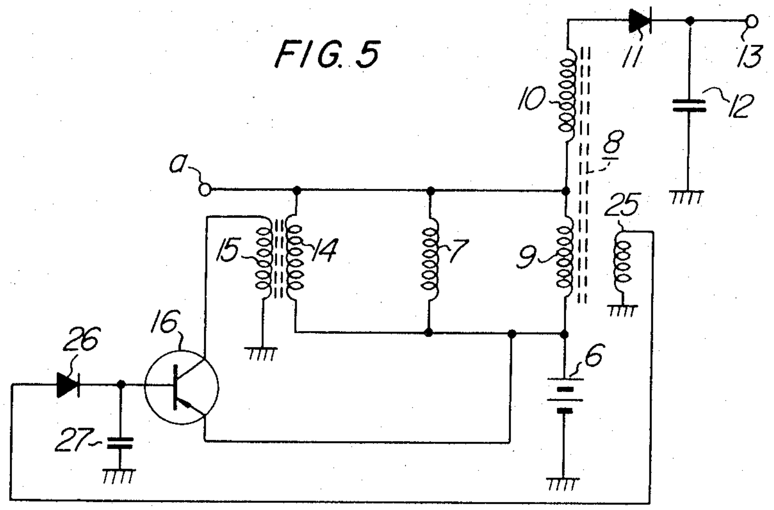
FIGS. 5 and 6 are diagrams showing essential portions of the circuit according to another embodiment of the present invention.

Referring to FIG. 5 there is shown a circuit diagram of a further embodiment of the present invention, in which reference numerals of parts used therein correspond to those in FIG. 3, and further a numeral 25 represents a winding wound around the flyback transformer 8 for detecting a variation in the high anode voltage, 26 a diode and 27 a capacitor.

The regulating operation in the aforementioned circuit is entirely the same as that of the embodiment shown in FIG. 3. It is, however, different in the means for detecting the variation in the anode voltage. That is, in this embodiment, a positive pulse induced in the detecting winding 25 wound around the flyback transformer 8 is rectified smoothly through the diode 26 and the capacitor 27 and thereafter it is applied to the base of the high-voltage regulation transistor 16.

Figure 6:
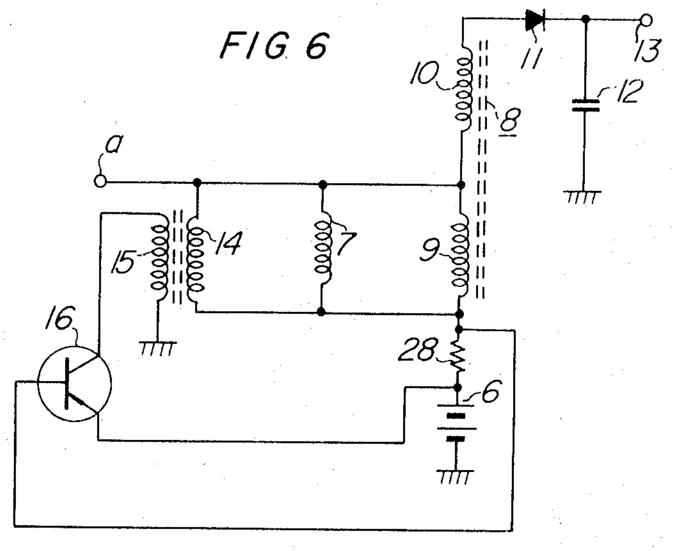

Referring to FIG. 6 there is shown a circuit diagram of a still further embodiment of the present invention, in which reference numerals of parts used therein correspond to these in FIG. 3 and further a numeral 28 represents a resistor. In this embodiment, a current passing through the DC voltage source is used as a means for detecting the variation in anode voltage. If the beam current of the CRT is increased, the current of the DC voltage source for supplying the power increases. Therefore, if the resistor 28 is connected in series to the source 6, a voltage which is variable according to the high voltage can be derived across the resistor 28. Thus, the derived voltage across the resistor is applied to the base electrode of the high-voltage regulation transistor 16.

In the aforementioned respective embodiments, the variation in the high anode voltage is derived from the high-voltage circuit or the horizontal deflection equivalent circuit B. It is, however, not limited to such manners. For example, the variation in the high anode voltage can be obtained in such a manner that a voltage proportional to the amplitude of a luminance signal $E_y$ or that of a chrominance signal particularly green chrominance signal $E_G$ is derived from the last stage transistor developing an output of the luminance signal or the chrominance signal. Various methods for applying the luminance signal and the chrominance signal to a cathode-ray tube are proposed.

Figures 7, 8, 9:
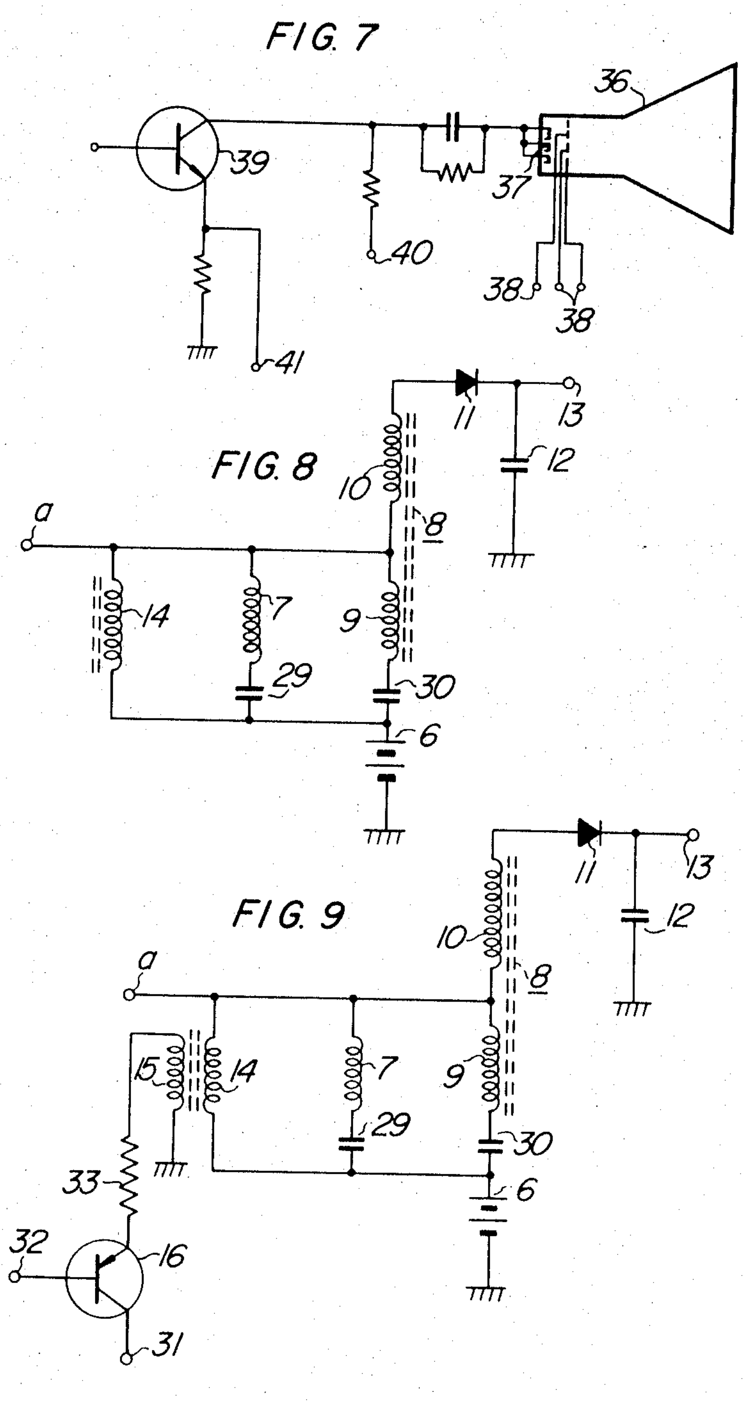
FIG. 7 is a diagram showing an embodied circuit for deriving a control signal.
FIGS. 8 to 12 are diagrams showing essential portions of the circuit according to further embodiments of the present invention.

Referring to FIG. 7, there is shown a circuit for deriving the variation in the anode voltage from a transistor in the last stage developing a luminance signal in a color difference system in which the luminance signal and the difference signal between the luminance signal and a chrominance signal are applied to the cathode and the grids of a cathode-ray tube, respectively. In the figure, numeral 36 represents a cathode-ray tube, 37 the cathode thereof, 38 grid terminals for applying the difference signals between a luminance signal and the respective chrominance signals to the grids of the CRT, 39 a video signal output transistor, 40 a power source terminal and 41 an output terminal for a control signal. An output signal from the control signal output terminal 41 is applied to the base of the high-voltage regulation transistor 16 shown in the above-mentioned embodiments. Similarly in the respective chrominance signals, each control signal can be introduced from each transistor in its last stage. The luminance signal $E_y$ is given by $$E_y = 0.30E_R + 0.59E_G + 0.11E_B \quad (13),$$

where $E_R$, $E_G$ and $E_B$ represent the voltage components of red, green and blue signals, respectively. In particular, since the variation of the green signal $E_G$ is nearer to that of the luminance signal $E_y$ than those of the remainder, the variation of the green signal $E_G$ is used as another control signal applied to the regulation transistor 16.

Referring to FIG. 8, there is shown a circuit of a still another embodiment of the present invention, in which reference numerals of parts correspond to those in FIG. 1, and numerals 29 and 30 represent DC stopping capacitors. In this embodiment a high-voltage regulation transistor and a control winding are not necessarily required contrary to in the above-mentioned embodiments and thus, the high-voltage regulation circuit is quite simple and economical. The circuit of the present embodiment is so constituted that the DC stopping capacitors 30 and 29 are connected in series to the primary winding 9 of the flyback transformer 8 and the dummy coil 7, respectively so that whole DC current supplied from the DC power source 6 may flow in the high voltage regulation coil 14. As high voltage regulation coil 14, for example, a coil wound around a saturable core is used. If the beam current of the CRT is increased, the DC current flowing in the high-voltage regulation coil 14 is also increased. As a result, the magnetic flux density of the saturable core approaches the saturation flux density thereof, so that the inductance $L_r$ of the coil 14 is reduced to cause the circuit to boost the reduced high voltage, thus the circuit being operated to regulate the high voltage. The circuit in this case is advantageous in that since the DC current flowing in the flyback transformer 8 is blocked by means of the DC stopping capacitor 30, the flyback transformer 8 is not easily saturated thereby making it possible to be of small size.

Referring to FIG. 9 a circuit diagram of still another embodiment of the present invention is illustrated, in which reference numerals of parts used therein correspond to those in FIGS. 3 and 7, numeral 31 designates a DC power source terminal, 32 an input terminal for a control signal and 33 a resistor inserted between the emitter electrode of the transistor 16 and the control winding 15. In the present embodiment the manners for controlling the high-voltage regulation coil 14 comprise in combination a control by means of the control winding 15 wound around a saturable core and such a control that the DC stopping capacitors 29 and 30 are provided to thereby make all the DC current flow in the coil 14 wound around the saturable core. The control input terminal 32 is impressed with a signal detected in the manner as described above. As the high voltage regulation transistor 16 any of an NPN-type and a PNP-type may be used. Needless to say, the polarity of a drive source or a control signal should be taken into consideration according to the type of transistor used therein.

In FIG. 9, the transistor 16 for driving the control winding 15 is used in the form of an emitter follower circuit. Such arrangement prevents the transistor 16 from being subjected to deterioration due to a spark occurring in a color picture tube or in a high-voltage rectifier tube. Furthermore, in case the resistance 33 is connected in series to the emitter electrode of the transistor 16 of the emitter-follower, supposing that R is the resistance of the resistor 33, *r* is the input resistance of the network involving the transistor which is observed at the side of the emitter and V is a surge pulse voltage developed across the control winding, the voltage, *r*1l*R*+*r*). V is impressed on the transistor 16 and the input resistance *r* is normally apppreciably small. Therefore, the insertion of the resistor 33 does effectively protect the transistor from such surge pulse voltage. Further no control is affected by the insertion of the resistor 33 because the current amplification factor of the transistor 16 is independent upon it. Needless to say, such emitter-follower circuit is not limited to the use of the embodiment in FIG. 9 and therefore, it is applicable also to the above-mentioned embodiment in which a transistor amplifier is employed.

Figure 10:
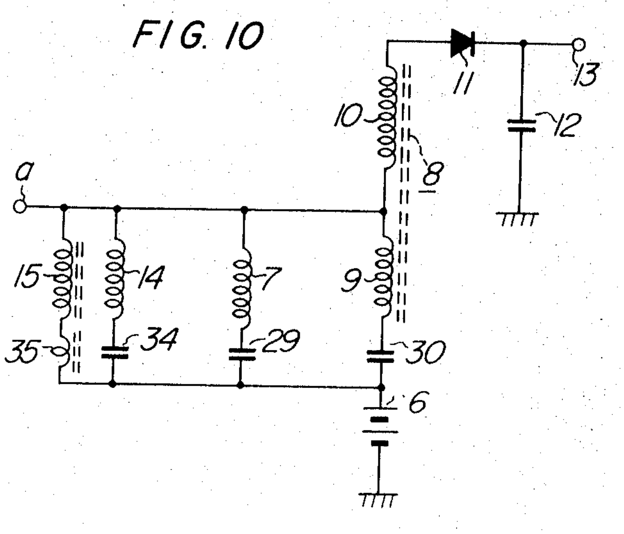

Referring to FIG. 10, there is shown a circuit diagram of a further embodiment of the present invention, in which reference numerals of parts used therein correspond to those in FIG. 1, numerals 29, 30 and 34 represent DC stopping capacitors and 15 a control winding and 35 an inductance element for preventing an AC current from flowing in the control winding 15. The present embodiment is such that the inductance $L_r$ of the high-voltage regulation coil 14 is controlled by the variation of a DC current supplied from the DC source 6 which is caused by the variation of the high voltage as in the embodiment of FIG. 8. That is, if the beam current of the CRT is increased, the DC current from the DC power source 6 is increased to flow in the control winding 15. Therefore, by the effect of the saturable core around which the high-voltage regulation coil 14 and the control winding 15 are wound the inductance $L_r$ of the coil 14 is reduced, thus operating to regulate the variation in high voltage.

Figure 11:
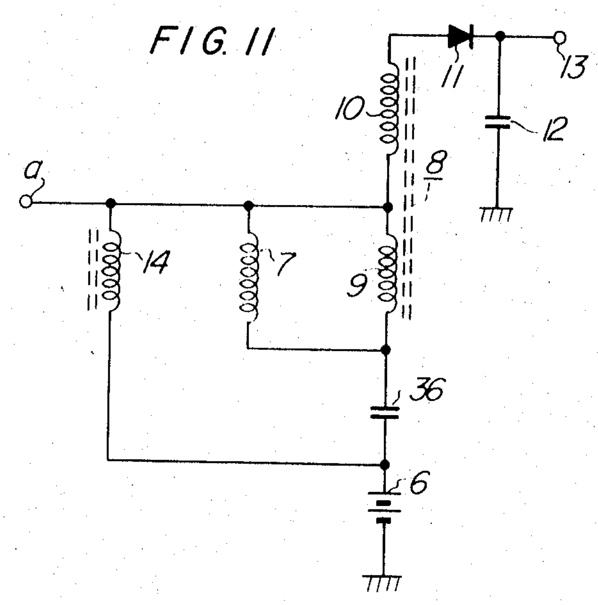

Referring to FIG. 11 there is shown a circuit of still another embodiment of the present invention, in which reference numerals of parts used therein correspond to those in FIG. 1 and numeral 36 represents a DC stopping capacitor. In this embodiment, the capacitor 36 serves as the DC stopping capacitors 29 and 30 shown in the embodiment of FIG. 8, whose operation is the same as that of the embodiment of FIG. 8. It should be noted that the art of this kind is applicable to the embodiment shown in FIG. 10 in the same manner.

In each of the above embodiments, the dummy coil 7 having a relatively low inductance value is substantially connected in parallel with the primary winding 9 of the flyback transformer 8 having a relatively high inductance value, so that a small value inductance actually determined by the inductance value of the dummy coil is loaded on the horizontal deflection equivalent circuit. Where the dummy coil 7 does not exist, the high voltage is hardly developed since the inductance of the horizontal deflection equivalent circuit is determined to be a very large value due to the primary winding of the flyback transformer.

However, if the primary winding of the flyback transformer is designed so as to have a small inductance value, that is, to be equal to the inductance of the parallel circuit consisting of the dummy coil 7 and the normal primary winding 9 shown in FIG. 8, the dummy coil 7 may be eliminated.

Figure 12:
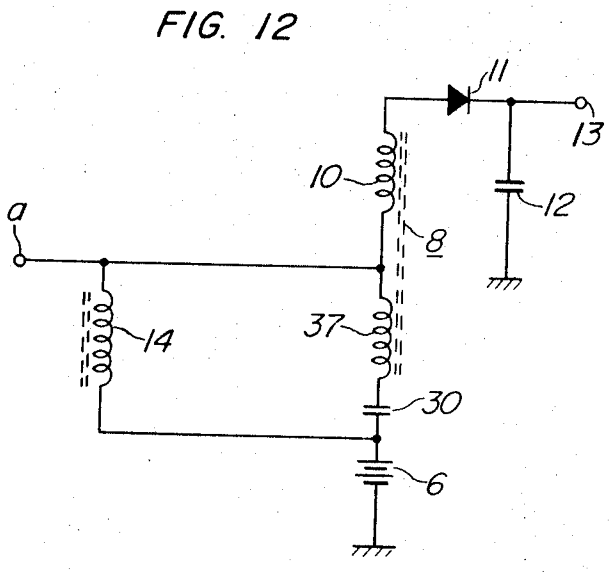

The constitution of the above circuit is shown in FIG. 12 which is a circuit diagram of a further embodiment of the present invention, in which reference numerals of parts used therein correspond to those in FIG. 8, and numeral 37 represents a primary winding of the flyback transformer 8, the inductance of which is approximately equal to the parallel inductance of the dummy coil 7 and the primary winding 9 shown in FIG. 8, whose operation is the same as that of the embodiment of FIG. 8. It should be noted that the art of this kind is applicable to the above respective embodiments in the same manner.

As described in detail hereinbefore, since the present invention can provide to regulate the high voltage without using any shunt regulator tube as in the prior art, the high-voltage regulation circuit of the television set can be made of small size without involving any problem of heat-sinking. Further the regulation circuit according to the present invention having no shunt regulator tube which is expensive therein is quite economical and permits reduction of emission sources of X-rays which are harmful to the human body. Furthermore, the present invention is advantageous to excellently realize all transistorized color television receivers.

What is claimed is:

1. A high-voltage regulation circuit for a color television receiver comprising:
   - a horizontal deflection equivalent circuit including at least a first transistor to which horizontal synchronizing pulses are supplied, and a damper diode as well as a resonance circuit coupled to said transistor, said resonance circuit comprising a capacitor and a dummy coil;
   - a high-voltage developing circuit coupled to said horizontal deflection equivalent circuit through a flyback transformer;
   - a variable inductance element connected in parallel with said dummy coil; and
   - means for decreasing and increasing the inductance of said variable inductance element in response to drop and rise in a high voltage developed by the high-voltage developing circuit, respectively.

2. A high-voltage regulation circuit for a color television receiver according to claim 1, wherein said control means comprises means for providing a control signal in response to the magnitude of the high voltage in said high-voltage circuit, a control winding for controlling the inductance of said variable inductance element, and means for increasing and decreasing a current flowing through said control winding in response to drop and rise of the level of said control signal.

3. A high-voltage regulation circuit for a color television receiver according to claim 2, wherein said variable inductance element comprises a saturable core and a high-voltage regulation coil which is wound around said core and is coupled substantially in parallel with said dummy coil, and wherein said control winding is wound around said saturable core.

4. A high-voltage regulation circuit for a color television receiver according to claim 3, wherein said saturable core is formed of a tripod core, said high-voltage regulation coil is separated into two portions each of which is wound around one of the outer legs of said tripod core, and said control winding is wound around the center leg of said tripod core.

5. A high-voltage regulation circuit for a color television receiver according to claim 3, wherein said saturable core is formed of a tripod core, said control winding is separated into two portions each of which is wound around one of the outer legs of said tripod core and connected in series together to be coupled in series with the dummy coil, and wherein said high-voltage regulation coil is wound around the center leg of the tripod core.

6. A high-voltage regulation circuit for a color television receiver according to claim 2, wherein said means for increasing and decreasing a current in the control winding is an amplifier composed of a second transistor, which constitutes an emitter-follower circuit in which said control winding is connected through an emitter resistor between the emitter and collector of said second transistor.

7. A high-voltage regulation circuit for a color television receiver according to claim 2, wherein said means for producing said control signal comprises voltage dividing resistor means supplied with the high voltage for outputing an output voltage as a divided component of the high voltage.

8. A high-voltage regulation circuit for a color television receiver according to claim 2, wherein said control signal is derived through a zener diode from a signal voltage provided by said voltage dividing resistor means.

9. A high-voltage regulation circuit for a color television receiver according to claim 2, wherein said means for providing said control signal comprises a third winding which is wound in a flyback transformer.

10. A high-voltage regulation circuit for a color television receiver according to claim 2, wherein said means for providing said control signal comprises a resistor connected in series between a power source for supplying a load current to said high-voltage developing circuit and the flyback transformer.

11. A high-voltage regulation circuit for a color television receiver according to claim 2, wherein said means for providing said control signal is a means for detecting a luminance signal.

12. A high-voltage regulation circuit for a color television receiver according to claim 2, wherein said means for providing said control signal is a means for detecting a chrominance signal.

13. A high-voltage regulation circuit for a color television receiver according to claim 1, wherein a primary winding of said flyback transformer is designed in such a manner that said dummy coil is incorporated therein.

14. A high-voltage regulation circuit for a color television receiver comprising:

horizontal deflection equivalent circuit including at least a first transistor to which horizontal synchronizing pulses are supplied, and a damper diode as well as a resonance circuit coupled to said transistor, said resonance circuit comprising a first capacitor and a dummy coil;

a high-voltage developing circuit coupled to said horizontal deflection equivalent circuit through a flyback transformer;

a second and a third capacitors connected in series to said dummy coil and a primary winding of said flyback transformer, respectively; and a variable inductance element connected in parallel to a series circuit composed of said dummy coil and said second capacitor.

15. A high-voltage regulation circuit for a color television receiver according to claim 14, wherein said primary winding is designed in such a manner that said dummy coil is incorporated therein.

16. A high-voltage regulation circuit for a color television receiver comprising:

a horizontal deflection equivalent circuit including at least a first transistor to which horizontal synchronizing pulses are supplied, and a damper diode as well as resonance circuit coupled to said transistor, said resonance circuit comprising a first capacitor and a dummy coil;

a high-voltage circuit coupled to said horizontal deflection equivalent circuit through a flyback transformer, a primary winding of which is connected in parallel with said dummy coil to constitute a parallel connection circuit;

a second capacitor connected in series to said parallel connection circuit; and a variable inductance element connected in parallel to a series circuit composed of said parallel connection circuit and said second capacitor.

17. A high-voltage regulation circuit for a color television receiver according to claim 16, wherein a primary winding of said flyback transformer is designed in such a manner that said dummy coil is incorporated therein.

18. A high-voltage regulation circuit for a color television receiver according to claim 16, wherein said variable inductance element includes a saturable core, and a high-voltage regulation coil which is wound around said saturable core.

19. A high-voltage regulation circuit for a color television receiver according to claim 18, the circuit further comprising means for providing a control signal in response to the magnitude of a high voltage in said high-voltage circuit, a control winding wound around said saturable core, and means for causing a current flowing in said control winding to increase or decrease in response to a drop or rise of the level of said control signal.

20. A high-voltage regulation circuit for a color television receiver according to claim 18, the circuit further comprising a capacitor connected in series to said high-voltage regulation coil, and a control winding connected in parallel to a series circuit composed of said high-voltage regulation coil and a capacitor, which winding is wound around said saturable core.

21. A high-voltage regulation circuit for a color television receiver according to claim 20, wherein an inductance element is connected in series to said control winding for blocking an AC current.

* * * * *